(12) United States Patent
Webb et al.

(10) Patent No.: US 6,400,895 B1
(45) Date of Patent: Jun. 4, 2002

(54) METHOD FOR OPTIMIZING MPEG-2 VIDEO PLAYBACK CONSISTENCY

(75) Inventors: Richard Whitby Webb, Cupertino; Michael L. Lightstone, Fremont, both of CA (US)

(73) Assignee: ATI International SRL, Barbados (KN)

( * ) Notice: Subject to any disclaimer, the term of this patent is extended or adjusted under 35 U.S.C. 154(b) by 0 days.

(21) Appl. No.: 09/238,669

(22) Filed: Jan. 26, 1999

(51) Int. Cl.⁷ .................................................. H04N 5/91
(52) U.S. Cl. .......................... 386/131; 386/46; 348/459
(58) Field of Search ........................... 386/46, 131, 129; 348/449, 558, 555–556, 459; H04N 5/91

(56) References Cited

U.S. PATENT DOCUMENTS 5,594,552 A * 1/1997 Fujinami et al. ............ 386/131
5,835,672 A * 11/1998 Yagasaki et al. ............ 366/111
6,148,035 A * 11/2000 Oishi et al. ............. 375/240.26
6,236,806 B1 * 5/2001 Kojima et al. .............. 386/131

* cited by examiner

Primary Examiner—Vincent Boccio
(74) Attorney, Agent, or Firm—Vedder, Price, Kaufman & Kammholz (57) ABSTRACT

The present invention provides a method for improving playback consistency of an encoded video stream. The method of the present invention first determines whether a series of values of the progressive_frame flag of consecutive frames of the encoded video stream are arranged in a predetermined pattern. If the values are arranged in the predetermined pattern, an image of at least one of the frames is displayed progressively regardless of the value of the progressive_frame flag of that frame. As a result, the video stream is played back as if the movie had been consistently encoded in the first place.

19 Claims, 7 Drawing Sheets

METHOD FOR OPTIMIZING MPEG-2 VIDEO PLAYBACK CONSISTENCY

BACKGROUND OF THE INVENTION

1. Field of the Invention

The present invention relates generally to multimedia processors and particularly to MPEG decoders.

2. Related Art

Encoded digital video streams are used in a variety of applications that allow videos to be distributed on a variety of media. For example, movies can be stored on Digital Video Disc (DVD) for distribution or rental purposes. Similarly, digital video streams can be broadcast (DVB) to multiple subscribers on pay-per-view systems. Alternatively, digital video streams can be transmitted over a computer network, such as the Internet, and viewed on remote computers without the need for a dedicated DVD player or a DVB receiver.

Several encoding standards, such as MPEG, MPEG-2, MPEG-4, AVI, QuickTime, etc. have been developed for encoding and distribution of digital video streams. Different standards allow for varying degrees of functionality versus storage requirements. For example, MPEG-2 is primarily designed for encoding movies and other audio-visual works. Similarly, MPEG-4 is designed to handle video streams transmitted over low bandwidth communication channels.

Movies, on the other hand, are typically shot on optical film at rate of 24 frames/second by means of a photographic process, while audio is captured on a separate medium, with audio-video synchronization added to either recording medium. To store movies as digital video streams, therefore, each frame must be first captured in electronic format and then encoded according to a pre-selected encoding standard.

Figure 1:
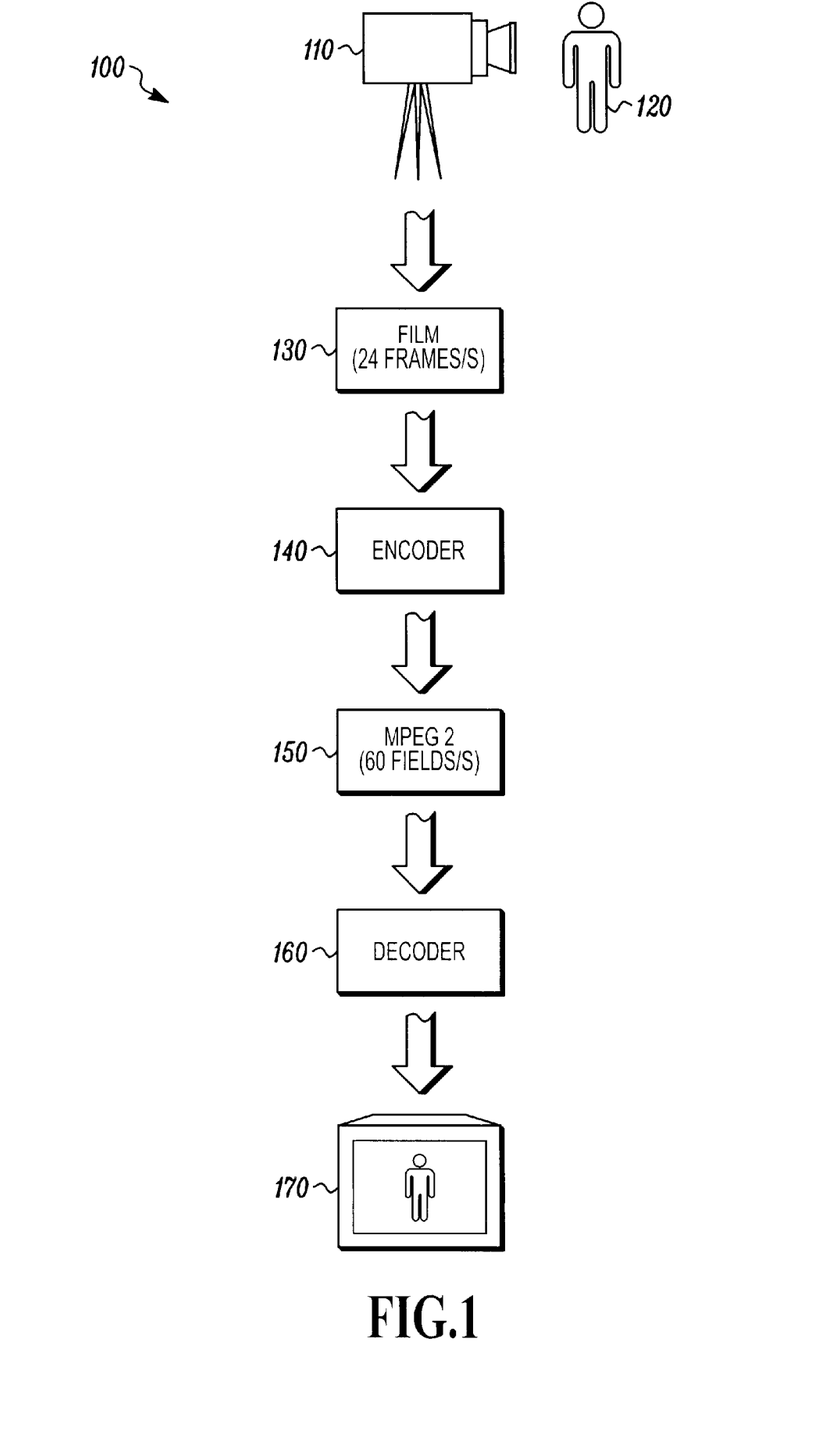
FIG. 1 is a block diagram of a system 100 for capturing and displaying an encoded digital video stream.

A system 100 for capturing and displaying an encoded digital video stream is illustrated in FIG. 1. First, a video camera 110 captures a scene 120 on film 130.

An encoder 140 then transfers the images stored on film 130 onto an encoded video stream 150 stored on an electronic storage medium. A decoder 160, in turn, decodes video stream 150 that is thus displayed on a screen of a display device 170. Decoder 160 can be either a dedicated device such as a DVD player or a general purpose device such as a computer. The display device 170 can be either a television set or a computer monitor.

Figure 2:
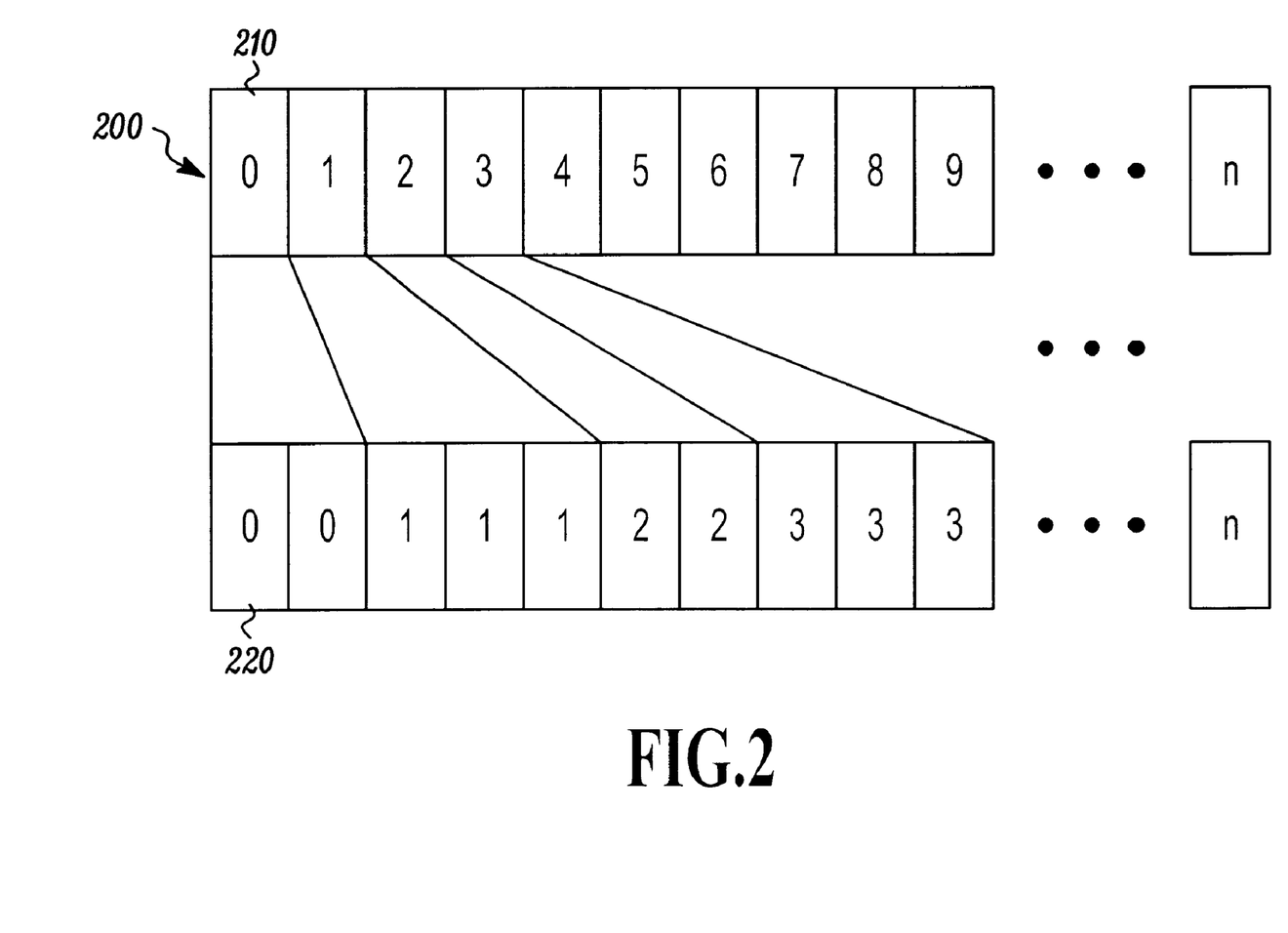
FIG. 2 is a diagram illustrating the playback timing relationship between movie frames and video fields.
Figure 3:
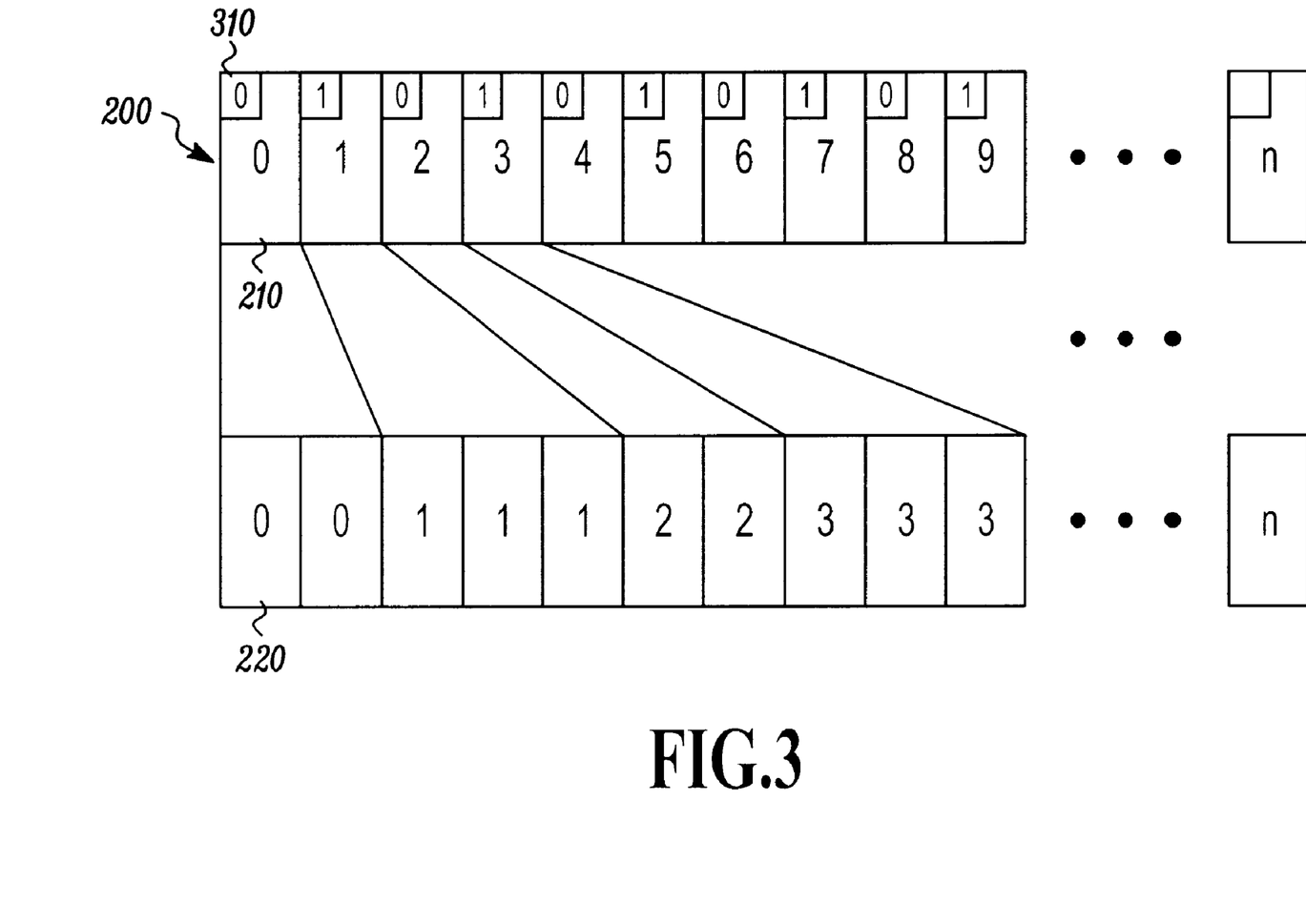
FIG. 3 is a diagram illustrating the playback timing relationship between images of an encoded video stream and the fields displayed by an interlaced display device.

Video streams encoded according to the MPEG-2 standard, for example, are often encoded for playback at a rate of 60 fields/second. A field 220 (FIG. 2) consists of only half the pixels of an image 210. By displaying successive fields 220 in rapid succession, the human eye perceives the entire image 210 as being displayed at once, while in reality only half image 210 is refreshed at any one time. Since only 24 frames where shot in the original movie for all 60 fields to be displayed during playback, each movie frame must be displayed an average of 2.5 times (60/24). This is typically, accomplished by displaying images 210 of successive frames 200 for a duration of 3 and 2 fields 220,in an alternating pattern, as shown in FIG. 2. This technique is typically referred to as "3-2 pulldown." The MPEG-2 standard provides a repeat_first_field flag 310 on each frame 200 to indicate whether image 210 is to be displayed for 2 or 3 fields 220,as shown in FIG. 3. For example, in FIG. 3, when repeat_first_field flag 310 has a value "0" image 210 is displayed for two fields 220, while when repeat_first_field flag 310 has a value "1" image 210 is displayed for three fields 220.

In addition, a time stamp (not shown) is included in each frame 200 of the encoded video stream representing a desired playback time for each frame 200. The decoder, in turn, examines the time stamps of each frame 200 to determine whether the timing relationship among the frames in the encoded video stream is preserved during playback or whether playback timing must be adjusted to compensate for variations in the decoding/display process.

The MPEG-2 standard also provides a progressive_frame flag 410 (FIG. 4) that indicates whether each encoded image 210 represents an interlaced or a non-interlaced image. An interlaced image is one in which consecutive fields 220 are captured at successive points in time. Thus, to preserve correct timing, each field 220 in an interlaced image must be displayed at a different point in time. Interlaced images are typically displayed correctly on interlaced display devices (e.g., televisions sets, interlaced computer monitors, etc.). However, displaying interlaced images on non-interlaced (progressively-scanned) monitors is problematic. Progressive displays, in fact, display complete images 210 at each refresh interval. Therefore, each field 220 in an interlaced image must be "filled" by interpolating values for the missing lines in each field 220. The interpolation process, however, results in a loss of image resolution and the introduction of artifacts which, in turn, degrade the overall image quality.

A non-interlaced image, by contrast, is an image 210 in which consecutive fields 220 are captured at the same time. Thus, playback of non-interlaced images on progressive monitors results in higher quality images because there are no missing lines.

Figure 4:
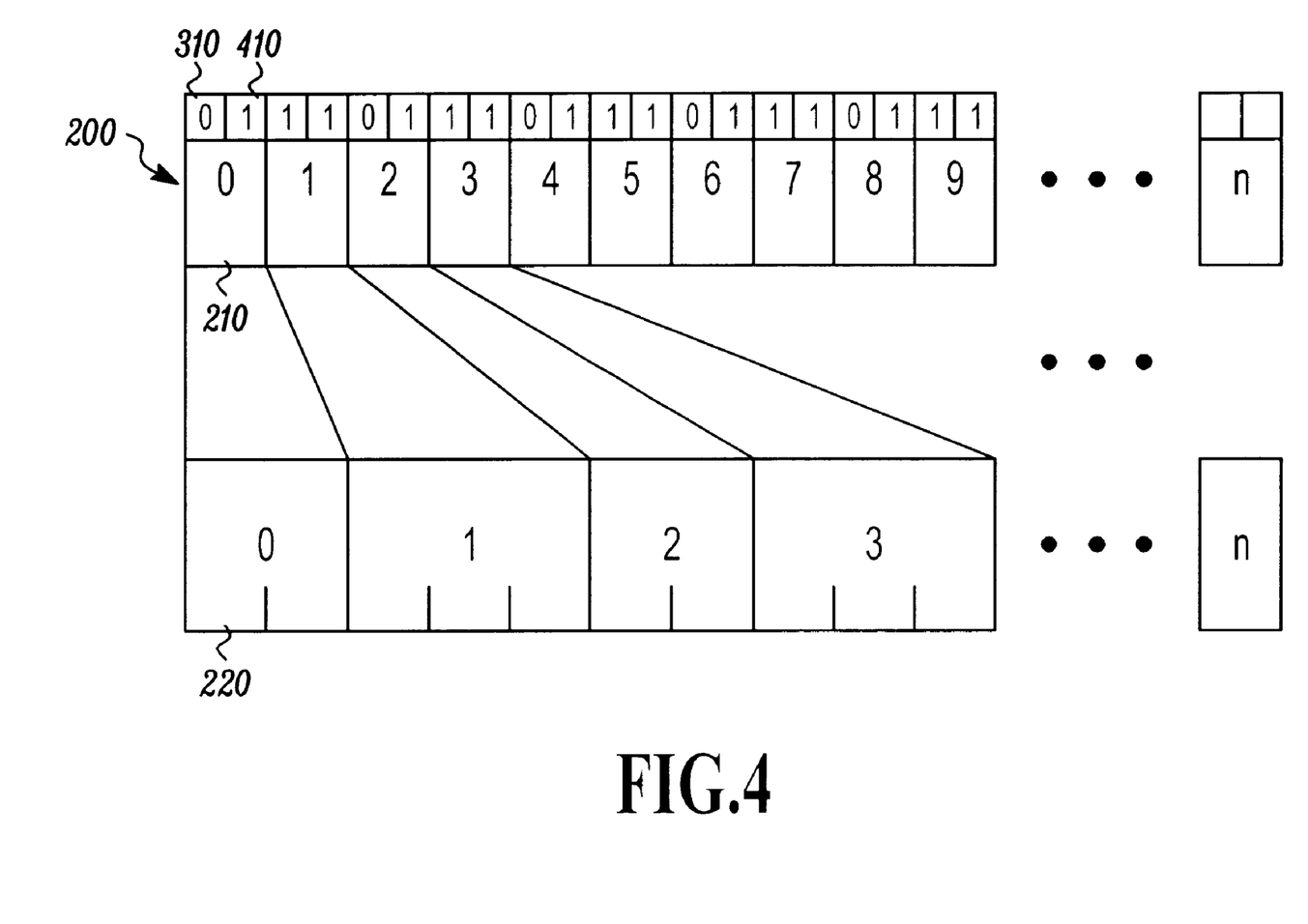
FIG. 4 is a diagram of the playback timing relationship between images of a consistently encoded video stream and the fields displayed by a progressive display device.
Figure 5:
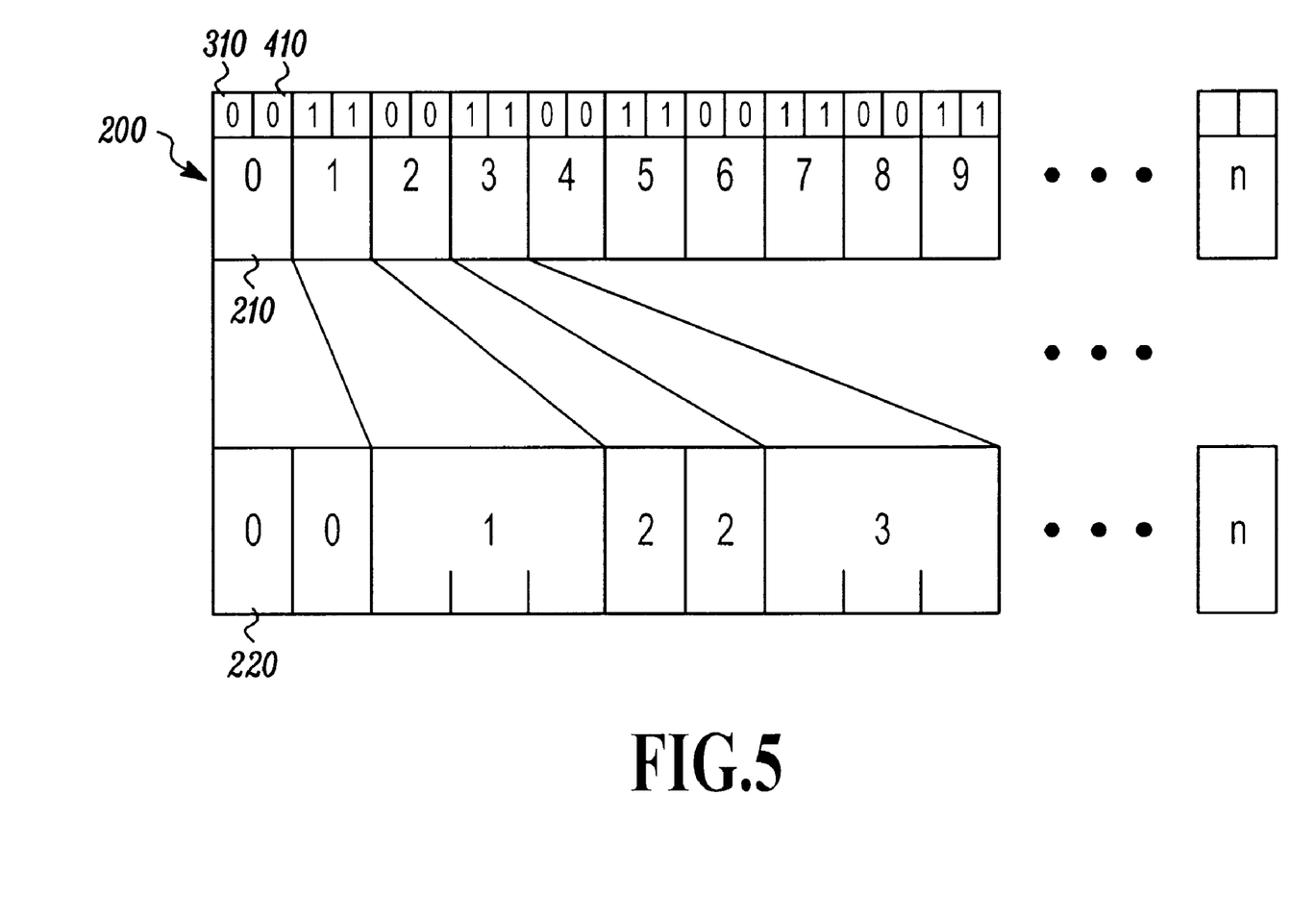
FIG. 5 is a diagram of the playback timing relationship between images of an inconsistently encoded video stream and the fields displayed by a display device.

Since the two fields in each movie frame are always shot at the same time, progressive_frame flag 410 should always be set to 1,as shown in FIG. 4. However, some encoders only set the progressive_frame flag to 1 when repeat_first_field flag 310 is also set to 1, as shown in FIG. 5. Movies encoded in such a fashion, therefore, are played back inconsistently on non-interlaced monitors, due to the alternation of display modes.

SUMMARY OF THE INVENTION

The present invention provides a method for improving playback consistency of an encoded video stream. The method of the present invention first determines whether a series of values of the progressive_frame flag of consecutive images of the encoded video stream are arranged in a predetermined pattern. If the values are arranged in the predetermined pattern, the image of at least one of the frames is displayed progressively regardless of the value of the progressive_frame flag for that frame. As a result, the video stream is played back as if the movie had been consistently encoded in the first place.

DETAILED DESCRIPTION OF THE INVENTION

Figure 6:
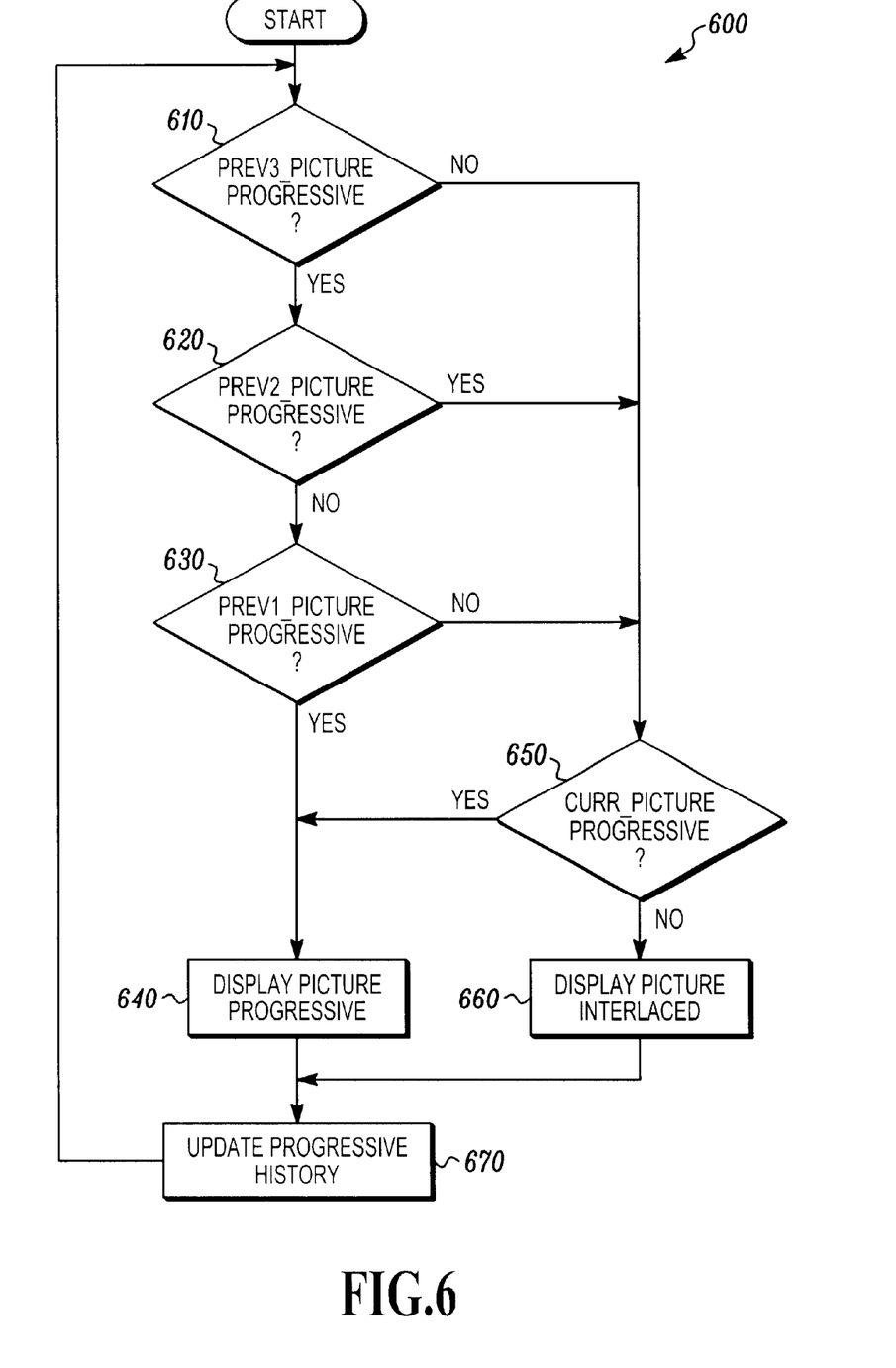
FIG. 6 is a flow diagram of inconsistent encoding circumvention operation, in accordance to an embodiment of the present invention.

To optimize playback consistency, the decoder must first be able to detect that the digital video stream has been inconsistently encoded. Once the inconsistent encoding has been detected, the decoder can then adjust the display operation to circumvent the inconsistency of the encoded playback information. FIG. 6 illustrates an inconsistent encoding circumvention operation 600, according to an embodiment of the invention.

Operation 600 examines the current frame 200 being processed by the decoder as well as the last three decoded frames 200 of the video stream. Stage 610 determines whether progressive_frame flag 410 of the third previously decoded frame 200 (i.e., the first of the four consecutive frames examined by operation 600) is set, in which case operation 600 proceeds to stage 620. Otherwise, operation 600 proceeds to stage 650. Stage 620 determines whether progressive_frame flag 410 of the second previously decoded frame 200 is set, in which case operation 600 proceeds to stage 650. Otherwise, operation 600 proceeds to stage 630. Stage 630 determines whether progressive_frame flag 410 of the first previously decoded frame 200 is set, in which case operation 600 proceeds to stage 640. Otherwise, operation 600 proceeds to stage 650. In other words, stages 610–640 of operation 600 determine whether progressive_frame flags 410 of the last three previously decoded frames 200 follow the pattern "101". Such a pattern indicates an encoding scheme where interlaced and non-interlaced images alternate in consecutive frames, a very improbable encoding scheme for movies. Those skilled in the art realize that other techniques known in the art could be used to detect an inconsistent encoding of a digital video stream in accordance to the principles of the invention. For example, the improper encoding could be detected by examining the video stream for a pattern other than "101" (e.g., "10101", "1010101", etc.). Accordingly, the invention is not limited to any particular technique for detecting the incorrect encoding of the video stream.

If the pattern is not detected, stage 650 determines whether progressive_frame flag 410 of the current frame 200 is set, in which case operation 600 proceeds to stage 640. Stage 640 displays image 210 of the current frame 200 progressively. Otherwise, stage 660 displays image 210 of the current frame in interlaced mode. Finally, the progressive_frame history is updated in stage 670. Display of image 210 in non-interlaced (progressively-scanned) mode in stage 640 may be effectuated by any suitable technique known in the art. For instance, each image 210 of the encoded video stream may be displayed as a single frame according to the time stamps provided in the encoded video stream. Alternatively, the time stamps can be adjusted so that each image 210 is displayed for approximately 1/24 of a second, rather than according to the 3-2 pulldown scheme embedded in the time stamps of the encoded streams.

Display of image 210 in interlaced mode in stage 660, on the other hand, is effectuated according to the 3-2 pulldown technique described above.

Finally, progressive_frame history data is updated in stage 670 by effectively shifting values of progressive_frame flag 410 of each of the frames 200 examined by operation 600 by one frame position and selecting the next frame 200 to be decoded as the current frame 200. As a result, stages 610–670 can be repeated to display each image 210 of the encoded video stream.

A possible software implementation of operation 600 is described in Table 1 below.

TABLE 1

```
if    (prev1_picture_progressive == TRUE) &&
      (prev2_picture_progressive == FALSE) &&
      (prev3_picture_progressive == TRUE) )
      display_picture_progressive = TRUE;
else
      display_picture_progressive = current_picture_progressive;
      prev3_picture_progressive == prev2_picture_progressive;
      prev2_picture_progressive == prev1_picture_progressive;
      prev1_picture_progressive == current_picture_progressive;
```

Table 1 contains a listing of computer source code written in the C programming language. An alternative implementation of operation 600 is illustrated in Table 2 below.

TABLE 2

```
progressive_history = (progressive_history << 1) +
            current_picture_progressive;
if(progressive_history == 10) //this corresponds to TFTF
      display_picture_progressive = TRUE;
else
      display_picture_progressive = current_picture_progressive;
progressive_history &=7; //truncates history to last 3 pics
```

Table 2 also contains a listing of a computer source code written in the C programming language. The implementation of Table 2 takes advantage of the bit manipulation feature of the C programming language to reduce the number of variables required to perform operation 600 with respect to the implementation of Table 1.

Those skilled in the art realize that the method of the present invention can be easily modified to correct the values of progressive_frame flag 410, as shown in FIG. 5, rather than overriding the values of progressive_frame flag 410. Table 3 contains a computer source code listing of a possible implementation of such a method.

TABLE 3

```
last_picture_progressive == current_picture_progressive;
if    (prev1_picture_progress:.ve == TRUE) &&
      (prev2_picture_progressive == FALSE) &&
      (prev3_picture_progressive == TRUE) )
      current_picture_progressive = TRUE;
prev3_picture_progressive = prev2_picture_progressive;
prev2_picture_progressive = prev1_picture_progressive;
prev1_picture_progressive = last_picture_progressive;
```

The computer source code segments of Tables 1, 2 and 3 can be implemented, for example, as digital circuitry embedded in a processor, as microcode executed by a graphics accelerator operatively coupled to a CPU, or as an application program executed by a general purpose computer.

Figure 7:
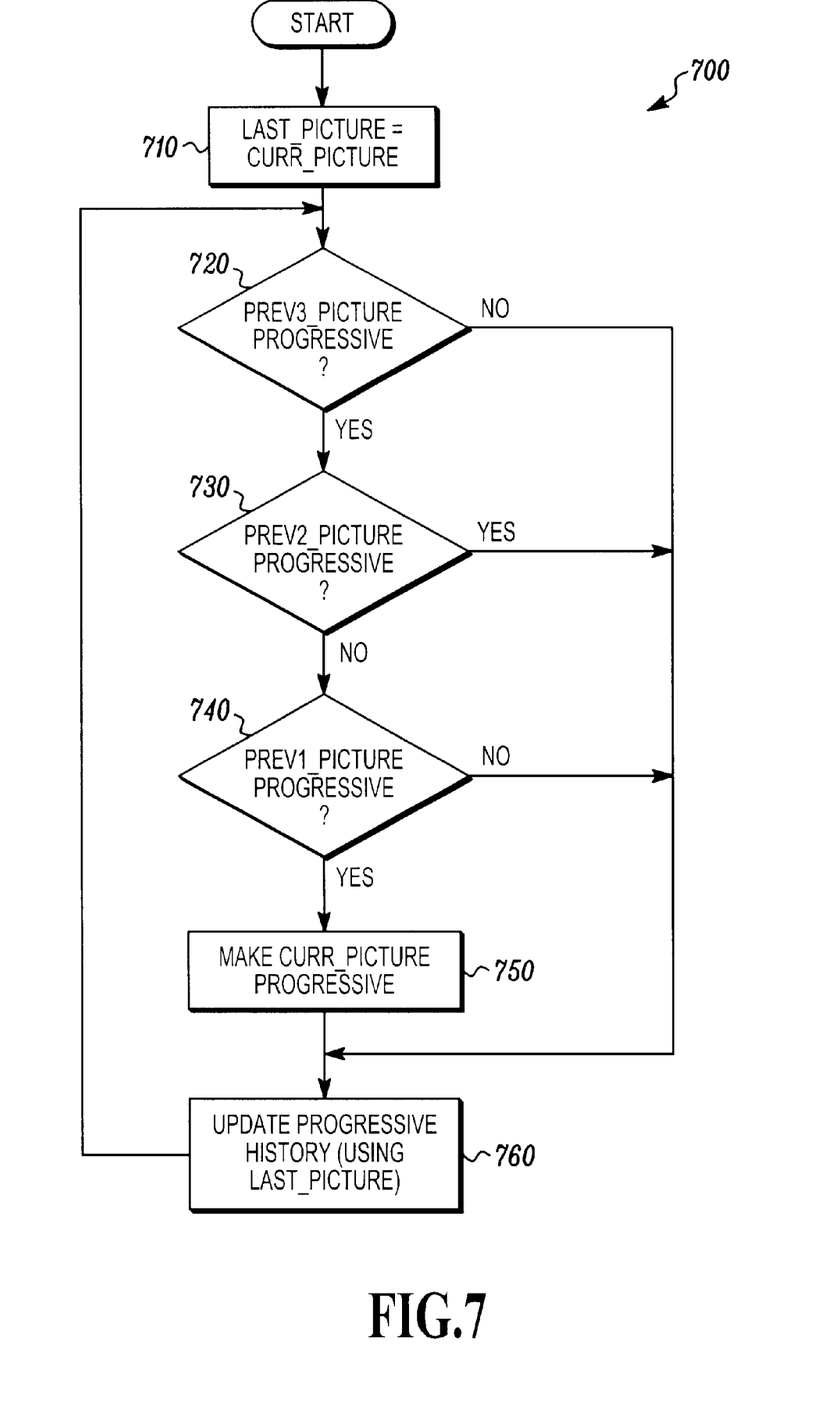
FIG. 7 is a flow diagram of inconsistent encoding correction operation, in accordance to an embodiment of the present invention.

FIG. 7 illustrates an inconsistent encoding correction operation 700, according to an embodiment of the invention.

Operation 700 examines the current frame 200 being processed by the decoder as well as the last three decoded frames 200 of the video stream. First, the value of progressive_frame flag 410 for the current frame 200 is saved in last_picture. Stage 720 then determines whether progressive_frame flag 410 of the third previously decoded frame 200 (i.e., the first of the four consecutive frames 200 examined by operation 700) is set, in which case operation 700 proceeds to stage 730. Otherwise, operation 700 proceeds to stage 760. Stage 730 determines whether progressive_frame flag 410 of the second previously decoded frame 200 is set, in which case operation 700 proceeds to stage 760. Otherwise, operation 700 proceeds to stage 740. Stage 740 determines whether progressive_frame flag 410 of the first previously decoded frame 200 is set, in which case operation 700 proceeds to stage 750. Otherwise, operation 700 proceeds to stage 760. Progressive_frame flag 410 for the current frame 200 is set in stage 750. Finally, the progressive history is updated in stage 760 using the value stored in last_picture, rather than the value stored in current_picture.

Embodiments described above illustrate but do not limit the invention. In particular, the invention is not limited by any particular test for detecting an inconsistent encoding of the video stream. In fact, detection schemes other than the ones described herein can be used in accordance to the principles of the invention. In addition, the invention is not limited to any hardware or software implementation. Those skilled in the art realize that the present invention can be implemented entirely in hardware, entirely in software or in any combination of hardware and software. Other embodiments and variations are within the scope of the invention, as defined by the following claims.

We claim:

1. A method for improving playback consistency of an encoded video stream, the method comprising:
   determining whether a series of values of a flag of consecutive frames of the encoded video stream are arranged in a predetermined pattern; and
   upon determining that the series of values of the flag are arranged in the predetermined pattern, displaying an image of at least one of the frames in progressive mode regardless of the value of the flag for that frame.

2. The method of claim 1, further comprising updating the series of values of the flag, after the image is displayed.

3. The method of claim 2, wherein the series of values of the flag are stored as a sequence of bits.

4. The method of claim 3, wherein the series of values of the flag are updated by shifting the sequence of bits and adding a new bit to the sequence.

5. The method of claim 1, wherein the video stream is encoded according to the MPEG-2 standard.

6. The method of claim 1, wherein the flag indicates whether the frame represents an interlaced or a non-interlaced image.

7. The method of claim 6, wherein the image is displayed differently according to whether the frame represents an interlaced or a non-interlaced image.

8. The method of claim 6, wherein each frame further includes a second flag representing a number of times the image is to be displayed during playback.

9. The method of claim 8, wherein the video stream is encoded based on a relationship between values of the first and the second flag.

10. A method for improving playback consistency of an encoded video stream, the method comprising:
    determining a value of a flag of a first, a second, a third and a fourth frame of the video stream, wherein the first frame precedes the second frame in playback order, the second frame precedes the third frame and the third frame precedes the fourth frame;
    determining whether the value of the flag of the first frame is equal to the value of the flag of the third frame and different from the values of the second and the fourth frames; and
    upon determining that the value of the flag of the first frame is equal to the value of the flag of the third frame and different from the values of the second and the fourth frames, displaying an image of the fourth frame in progressive mode regardless of the value of the flag for the fourth frame.

11. The method of claim 10, further comprising updating a series of values of the flag, after the image is displayed.

12. The method of claim 11, wherein the series of values of the flag are stored as a sequence of bits.

13. The method of claim 11, wherein the series of values of the flag are updated by shifting the sequence of bits and adding a new bit to the sequence.

14. The method of claim 10, wherein the video stream is encoded according to the MPEG-2 standard.

15. The method of claim 10, wherein the flag indicates whether the frame represents an interlaced or a non-interlaced image.

16. The method of claim 15, wherein the image is displayed differently according to whether the frame represents an interlaced or a non-interlaced image.

17. The method of claim 15, wherein each frame further includes a second flag representing a number of times the image is to be displayed during playback.

18. The method of claim 17, wherein the video stream is encoded based on a relationship between values of the first and the second flag.

19. A method for modifying an encoded video stream for improving playback consistency, the method comprising:
    determining whether a series of values of a flag of consecutive frames of the encoded video stream are arranged in a predetermined pattern; and
    upon determining that the series of values of the flag are arranged in the predetermined pattern, modifying the value of the flag of at least one of the frames in the video stream.

* * * * *